United States Patent [19]

Itou et al.

[11] 4,402,057
[45] Aug. 30, 1983

[54] METHOD OF AND APPARATUS FOR ENSURING CORRECT OPERATION OF A MICROCOMPUTER IN THE EVENT OF POWER OUTAGE

[75] Inventors: Tomio Itou; Masanori Mizote, both of Yokosuka, Japan

[73] Assignee: Nissan Motor Company, Limited, Yokohama, Japan

[21] Appl. No.: 1,168

[22] Filed: Jan. 5, 1979

[30] Foreign Application Priority Data

Jan. 11, 1978 [JP] Japan .................. 53/1680

[51] Int. Cl.³ .............. G06F 7/00; G06F 11/00; G06F 11/16
[52] U.S. Cl. .............................. 364/900
[58] Field of Search ... 364/200 MS File, 900 MS File, 364/424, 119; 340/52 F

[56] References Cited

U.S. PATENT DOCUMENTS

| | | | |
|---|---|---|---|
| 3,544,777 | 12/1970 | Winkler | 371/68 |
| 3,646,516 | 2/1972 | Flinders | 371/68 |
| 3,659,275 | 4/1972 | Marshall | 364/200 |
| 3,810,116 | 5/1974 | Prohofsky | 364/200 |
| 3,821,715 | 6/1974 | Hoff et al. | 445/1 |
| 3,828,321 | 8/1974 | Wilber | 364/200 |
| 3,835,819 | 9/1974 | Anderson | 364/900 |
| 3,959,778 | 5/1976 | Brette | 364/200 |
| 3,964,018 | 6/1976 | Strait et al. | 340/52 F |
| 3,964,302 | 6/1976 | Gordon et al. | 340/52 F |
| 4,010,450 | 3/1977 | Porter et al. | 364/200 |
| 4,045,779 | 8/1977 | Markle | 364/200 |
| 4,075,693 | 2/1978 | Fox et al. | 364/200 |
| 4,128,885 | 12/1978 | Valek et al. | 364/424 |
| 4,131,942 | 12/1978 | Gillett et al. | 364/200 |
| 4,159,531 | 6/1979 | McGrath | 364/424 |

Primary Examiner—Gareth D. Shaw
Assistant Examiner—John G. Mills
Attorney, Agent, or Firm—Lowe, King, Price & Becker

[57] ABSTRACT

A reference check bit pattern is stored in a nonvolatile storage medium of a vehicle-mounted microcomputer. A portion of a volatile storage medium is allocated for the purpose of storing the reference check bits. The microcomputer is programmed to compare the check bits stored in both the volatile and nonvolatile storage mediums. In response to a command signal, a mismatch is detected between the reference check bits of the volatile and nonvolatile mediums to indicate that data stored in the volatile memory have failed due to a power outage. The failed check data of the volatile memory is rewritten with the reference check data in the nonvolatile memory for later comparison. At the same time all data stored in the remaining portion of the volatile memory is erased so the remaining portion can accept a set of fresh input data. When a match occurs the computer proceeds with the normal computing functions.

12 Claims, 3 Drawing Figures

METHOD OF AND APPARATUS FOR ENSURING CORRECT OPERATION OF A MICROCOMPUTER IN THE EVENT OF POWER OUTAGE

BACKGROUND OF THE INVENTION

The present invention relates generally to electronic digital microcomputers and more specifically to a method for operating a microcomputer to present data damage caused by power outage.

Digital microcomputers are finding extensive use in many applications for various purposes. For example, in automotive applications, digial microcomputers are used for controlling operation of an engine at optimum conditions to meet emission standards and to achieve fuel economy. One problem with digital microcomputers is that if a microcomputer power supply is disconnected or fails, the data stored in the microcomputer storage mediums are destroyed. In automobiles this is a problem when the wet cell battery fails or is removed from the vehicle for recharging of failure. Although the use of nonvolatile memories can avoid the destruction of important data during power outage periods, such memories require a complex data transfer circuitry with a consequential unreliability and increase in cost. Another approach is to employ a complementary MOS memory which is powered exclusively from a trickle-charged power supply separate from the main battery. However, such a trickle-charged battery requires an additional maintenance effort to assure reliable operation.

SUMMARY OF THE INVENTION

In the present invention reference check data are stored in a nonvolatile memory, such as a read-only memory, which also stores instruction data for the usual stored program of the microcomputer. The instruction data contains information necessary for the microcomputer to perform various computing functions. A certain area of a reprogrammable volatile memory, such a random access memory, is used exclusively as a storage location to which the reference check data is transferred. The microcomputer is programmed to retrieve the check data from both memories to check them against each other in response to a command signal. In the automotive application, the command signal is generated in response to the engine being started. If a match is detected in response to the command signal the computer proceeds with its usual functions. However, if a power outage has occurred, data stored in the volatile memory are lost, causing detection of mismatch. All of the data stored in the volatile reprogrammable memory are erased and the reference check data are transferred again to the volatile memory for later checking operations. The microcomputer is prevented from proceeding with the usual computing functions until the reprogrammable memory is updated with input data received from various sensing devices.

In a practical embodiment, the present invention is provided in a system including an internal combustion engine is operated on a closed loop control mode based on a feedback control signal derived from an exhaust gas sensor. The feedback control signal is processed through the microcomputer together with other signals representing other engine operating parameters. Such feedback control requires searching data representing the initial conditions of the engine. The initial data are stored in the volatile reprogrammable memory to be utilized when the feedback control is initiated in a subsequent engine operation. The initial operating data are important for automatically calibrating the system since there is a distribution of engine operating parameters between different engines, which would otherwise require accurate calibration of each engine to its specific performance data. The initial engine operating data, which are lost should power outage occur, is updated automatically with data supplied from the various sources or sensors after the engine completes at least one crankshaft revolution.

Since only a small number of check bits is sufficient to assure a valid indication of a loss of data due to power outages, the check data do not occupy substantial areas within the microcomputer. Therefore, the present invention can be embodied with no substantial attendant cost.

It is therefore an object of the present invention to provide a method for ensuring a microcomputer against false data due to possible power outages or failures.

It is another object of the invention to provide a method for ensuring a microcomputer against power outages in an economical and reliable manner.

BRIEF DESCRIPTION OF THE DRAWINGS

The invention is further described by way of example with reference to the accompanying drawings, in which.

DETAILED DESCRIPTION

Figure 1:
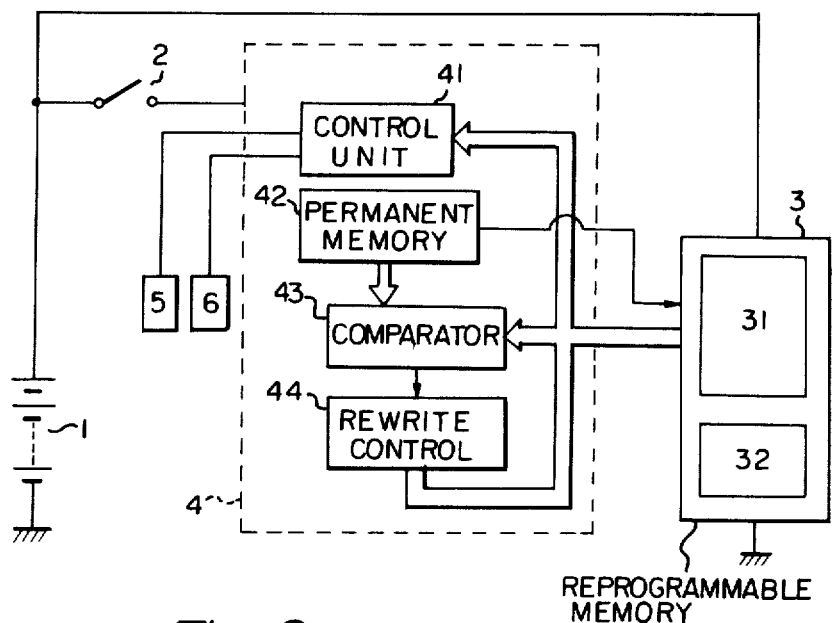
FIG. 1 is a schematic block diagram of the system of the invention.

In FIG. 1 of the drawings, the microcomputer 10 embodying the present invention is shown as comprising a memory unit 3 powered from a DC voltage source 1 which is the storage battery of a roadway vehicle. The central processor unit 4 of the microcomputer 10 is also powered from voltage source 1, but by way of a switch 2 which may be the ignition switch of the vehicle. The central processor unit 4 is shown as comprising a control unit 41, a permanent memory unit 42, a comparator unit 43 which detects correspondence between input data received from the memory units 42 and 3, and a data rewrite unit 44.

The memory unit 3 includes a data memory section 31 in which all of the data necessary to perform computer operations are stored and a special memory section 32, exclusively used for the storage of the same data as stored in the permanent memory 42.

The permanent memory 42 is of the type in which the stored data is not erased even though the power is cut off and in which a check bit pattern is stored.

The control unit 41 receives various input data derived from strategic points of the vehicle through input devices as represented by a block 5. Control unit 41 delivers output data signals to output devices such as actuators and display devices represented by a block 6.

The permanent memory 42 also stores pre-programmed basic instruction data necessary to perform computing operations. Additionally, permanent memory 42 is programmed to instruct the control unit 41 to enable the comparator unit 43 to compare the check bit pattern stored in memory 42 with the data stored in the special memory section 32. The comparison is in response to the switch 2 being manually closed. If comparator 43 signals that a correspondence occurs between the two sets of data, the comparator unit 43 produces no output signal; if no correspondence occurs, this is an indication that the data stored in memory unit 3 have been partially or entirely destroyed and the comparator unit 43 provides a data rewrite instruction to the data rewrite unit 44. Data rewrite unit 44 responds to the data rewrite instruction by supplying an instruction signal to the control unit 41 to clear all of the data now stored in the memory sections 31 and 32. Simultaneously, the rewrite unit 44 provides an instruction signal to the control unit 41 to transfer the check bit pattern in memory 42 to the memory section 32 for purposes of checking it against the reference bits in memory 42. Responsive to the data rewrite information, the control unit 41 transfers various input data received from the input devices 5 to the memory section 31.

If the battery 1 is removed from the vehicle to be recharged or the battery voltage has dropped below the normal operating level thereof, the data stored in the memory unit 3 are lost, so that the contents of the memory 3 take on indefinite binary levels. In response to the manual operation of the switch 2 simultaneously with the start of the vehicle, the check bits previously stored in the memory section 32 are checked against the reference check data in memory 42 to detect a mismatch between them to update all of the data previously stored in the memory unit 3.

Figure 2:
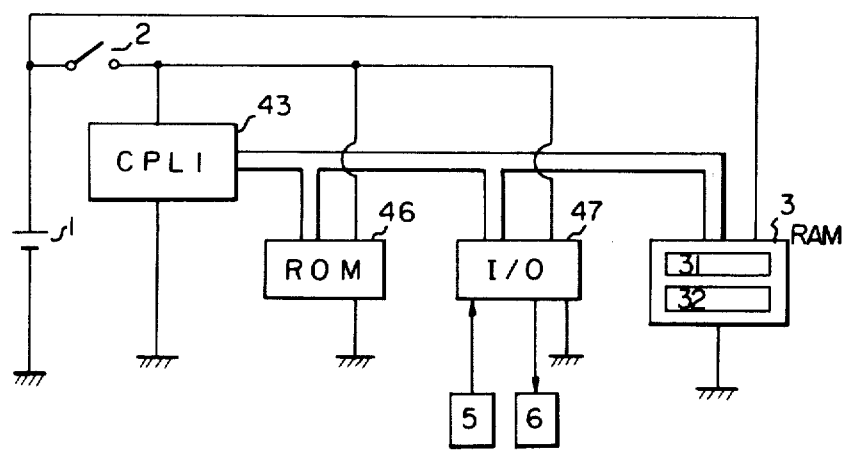
FIG. 2 is a practical form of the system of FIG. 1.

As illustrated in FIG. 2, permanent memory 42 may be a read-only member ROM 46 in which basic instruction data and check data are stored. Since the read-only memory 46 is of a nonvolatile type storage medium and since only a small number of check bits is sufficient to detect mismatch, the present invention provides advantages in terms of cost and reliability over the conventional methods.

As illustrated in FIG. 2, the central processor unit 45 includes central processing unit (CPU) 43 and input-/output unit (I/O) 47 and the read-only memory 46 is shown as a separate unit. Input and output data are applied through an input/output interface 47. The memory unit 3 is shown as comprised of a random access memory.

In a practical embodiment read-only memory 46 is programmed to cause CPU 45 to sequentially generate reference data words, each having four bits to represent a particular decimal numer, part 32 of the random access memory 3 is allotted for storing of the same reference data words. The microcomputer is programmed to perform a data check on a word-at-a-time basis. The central processor 45 is provided with a counter (not shown) which counts clock pulses supplied thereto to generate a set of four binary digits which is compared with a set of four bits retrieved from the random access memory 32.

Figure 3:
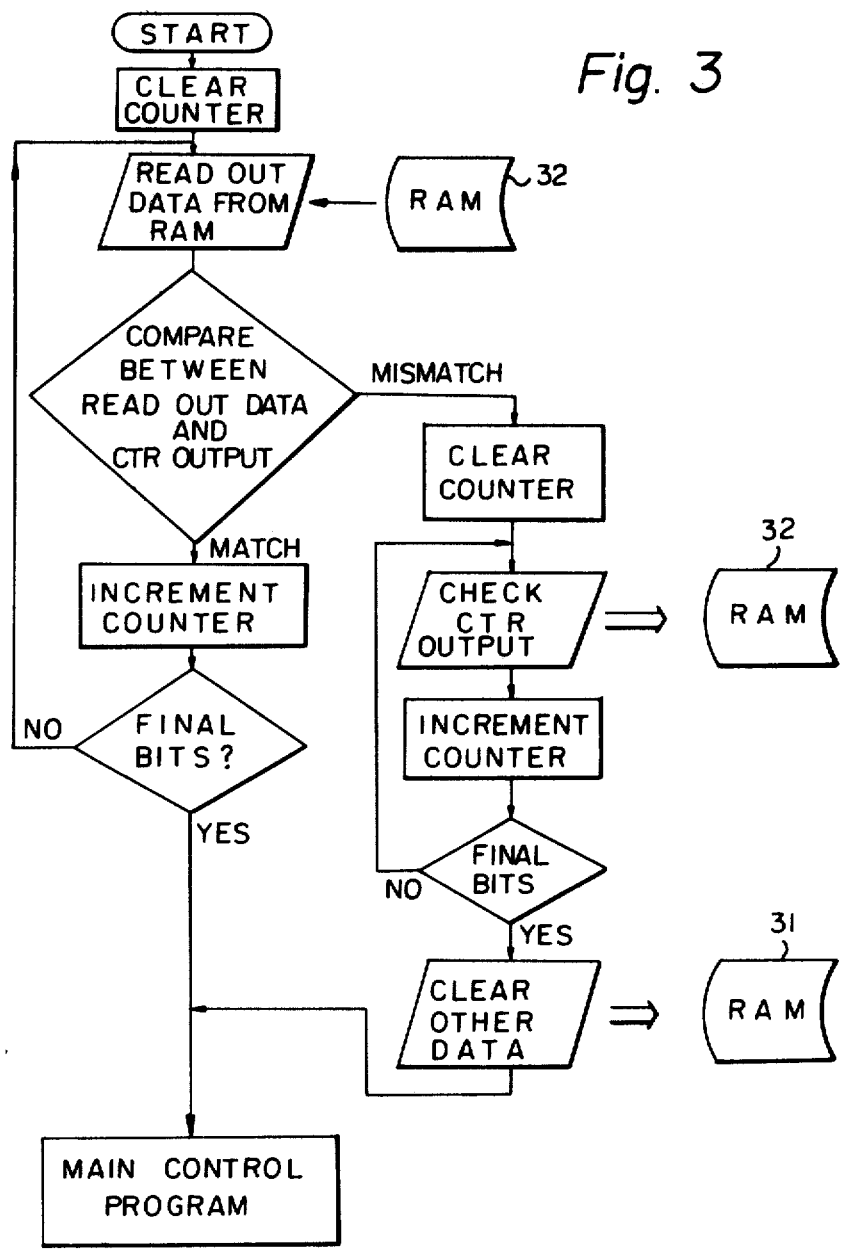
FIG. 3 is a flow diagram useful for describing the operation of the system of FIG. 2.

FIG. 3 is an illustration of the process for sequentially checking the generated check data words against the data words stored in the random access memory 32. In response to the manual operation of switch 2, the counter in CPU 43 is reset to zero to receive clock pulses. When the counter generates a first data word set by the program, the first data word is retrieved from the random access memory 32 to compare the output from the counter with the retrieved data. When a match occurs, the counter is incremented until the next data word is generated. This process is repeated until a predetermined number of data words is generated. If all of the data words so generated in the counter are matched against the data words stored in the random access memory 32, program control goes to the main program functions.

If mismatch occurs between the checked data words, the counter is cleared again to accept clock pulses to generate the first data word which is then transferred to the random access memory 32. The counter is automatically incremented in accordance with the stored program to generate subsequent data words and these data words are successively transferred to the random access memory 32. This process is repeated until all of the data words are transferred to the memory 32. When this process is completed, all the data stored in the random access memory 31 are cleared and the control process returns to the program functions.

What is claimed is:

1. A method of operating a microcomputer provided with nonvolatile storage means storing a check data signal and read/write volatile storage means of the type that store bit values only while power is supplied thereto, said method enabling the volatile storage means to be tested to determine if the contents thereof have changed in response to power not being supplied thereto, the check data enabling the volatile storage means to be checked to determine if data stored therein has changed as a result of power not being supplied thereto, comprising storing the check data signal in an allocated portion of said read/write storage means and storing in the remaining portion of said read/write storage means other data needed to perform computer functions, detecting a match or mismatch between the check data signal stored in said nonvolatile storage means and the data signal stored in said allocated portion of said read/write storage means each time power is applied to the microcomputer, setting all bits stored in said remaining portion of said read/write storage means to a predetermined state and writing said check data signal stored in said nonvolatile storage means into said allocated portion of said read/write storage means in response to a mismatch being detected, and operating said microcomputer in accordance with the normal computer functions thereof using data stored in said remaining portion of said read/write storage means in response to a match being detected between the stored check data in said nonvolatile storage means and the data signal stored in said allocated portion of said read/write storage means.

2. The method of claim 1 wherein the check data signal stored in said nonvolatile storage medium is a plurality of data words, and performing said detection on a word-at-a-time basis.

3. The method of claim 2 wherein said check data signal stored in said nonvolatile storage medium is in the form of instruction data to successively generate said data signal.

4. The method of claim 1, 2 or 3 wherein said nonvolatile storage medium comprises a read-only memory.

5. The method of claim 1 wherein said power source is mounted in an engine-powered vehicle, and generating the command signal for detecting the match or mismatch in response to start of the engine of said vehicle.

6. The method of claim 1 wherein said power source is mounted in an engine-powered vehicle including an ignition switch, and generating the command signal for detecting the match or mismatch in response to the operation of the ignition switch of the vehicle.

7. Apparatus for fail-safe operating a programmed digital system energized by a power source that is subject to being applied to and removed from the system comprising a memory system including a nonvolatile binary memory and a volatile binary memory, the nonvolatile binary memory storing a predermined arrangement of bit values that form a check signal, the volatile binary memory being subject to loss of bit values in the event of the power source being removed from the system, one portion of the volatile memory storing the bit values of the check signal, the check signal enabling the volatile storage means to be checked to determine if the signal stored therein has changed as a result of power not being supplied thereto, another portion of the volatile memory storing bit values in connection with operation of the system, a binary comparator, a command signal source activated to derive a signal in response to power being initially applied to the system, means responsive to the signal from the command signal source for supplying the bit values that form the check signal from the nonvolatile memory to the binary comparator, said binary comparator responding to the bit values supplied to it in response to derivation of the signal from the command signal source to derive an output signal indicative of a match and mismatch between the bit values for the check signal and from the one portion of the volatile memory, means responsive to the output signal for activating a program section of the memory system so that the digital system proceeds with its normal operation when the output signal indicates a match, and responsive to the output signal indicating a mismatch for setting all binary values stored in the volatile memory to a predetermined value and for transferring the bit values of the check data signal from the nonvolatile memory to the one portion of the volatile memory.

8. The apparatus of claim 7 wherein the program section of the memory system is in a segment of the nonvolatile memory different from a region of the nonvolatile memory where the check bits are stored so that the bit values associated with the program and read from the nonvolatile memory segment in response to the first value of the output signal.

9. The apparatus of claim 7 or 8 wherein the system includes a start switch, and means responsive to energization of the start switch for activating the command signal source.

10. The apparatus of claim 7 or 8 wherein the system includes an input data means, and means responsive to the comparator output signal indicating a mismatch for transferring signals from the input data means to the volatile memory.

11. A programmed digital system energized by a power source that is subject to being applied to and removed from the system comprising data source means, a memory system including a nonvolatile binary memory and a volatile binary memory, the nonvolatile memory storing a program for controling operation of the system, the nonvolatile binary memory storing a predetermined arrangement of bit values that form a check signal, the volatile binary memory being subject to loss of bit values in the event of the power source being removed from the system, the system capable of determining whether the volatile binary memory has lost bit values in response to the power source being removed from the system, the check signal enabling the volatile storage means to be checked to determine if the signal stored therein has changed as a result of power not being suplied thereto, one portion of the volatile memory storing the bit values of the check signal, another portion of the volatile memory storing bit values in connection with signal values derived from the data source means, a source of command signals, control means responsive to (a) a signal from the command signal source and a mismatch between the check signals in the nonvolatile memory and bit values in the one portion of the volatile memory for supplying the check signal from the nonvolatile memory to the one portion of the volatile memory and for supplying signals from the data source means to the another portion of the volatile memory and for thereafter activating the program stored in the nonvolatile memory, and (b) a signal from the command signal source and a match between the check signal in the nonvolatile memory and bit values in the one portion of the volatile memory for activating the program stored in the nonvolatile memory without either supplying the check signal from the nonvolatile memory to the one portion of the volatile memory or supplying signals from the data source means to the another portion of the volatile memory.

12. The apparatus of claim 11 wherein the system includes an input data means, the control means responding to the mismatch for transferring signals from the input data means to the volatile memory.

* * * * *